(12) United States Patent
Wellman

(10) Patent No.: US 7,205,251 B2
(45) Date of Patent: Apr. 17, 2007

(54) STRUCTURAL COMPOSITE

(75) Inventor: Scott A. Wellman, Plymouth, MI (US)

(73) Assignee: NVH Concepts, L.L.C., VanBuren Township, MI (US)

( * ) Notice: Subject to any disclaimer, the term of this patent is extended or adjusted under 35 U.S.C. 154(b) by 178 days.

(21) Appl. No.: 10/909,915

(22) Filed: Aug. 2, 2004

(65) Prior Publication Data

US 2005/0048858 A1  Mar. 3, 2005

Related U.S. Application Data

(63) Continuation-in-part of application No. 10/079,840, filed on Feb. 19, 2002, now abandoned.

(60) Provisional application No. 60/269,277, filed on Feb. 16, 2001.

(51) Int. Cl.
 *B32B 5/26* (2006.01)
 *B32B 5/18* (2006.01)
 *B32B 5/08* (2006.01)

(52) U.S. Cl. ............... 442/225; 442/226; 442/269; 442/278; 442/367; 442/373; 442/374

(58) Field of Classification Search ............ 442/221, 442/30, 172, 173, 180, 367, 181, 225, 226, 442/269, 278, 373, 374; 428/66.6, 80, 77, 428/137, 317.9, 318.4, 297.4
See application file for complete search history.

(56) References Cited

U.S. PATENT DOCUMENTS

| | | | |
|---|---|---|---|
| 4,374,170 A | 2/1983 | Fesko | |
| 4,451,528 A | 5/1984 | Krause | |
| 4,758,458 A * | 7/1988 | Schutze | ............... 428/113 |
| 5,271,300 A | 12/1993 | Zurbuchen et al. | |
| 5,584,897 A | 12/1996 | Christianson et al. | |
| 5,667,206 A | 9/1997 | Chang | |
| 5,789,073 A | 8/1998 | Odagiri et al. | |
| 6,524,690 B1 | 2/2003 | Dyksterhouse | |

OTHER PUBLICATIONS

Mechanical Engineers' Handbook, p. 176, Section 9.5.6, 1998.
"Fiber" Complete Textile Glossary, Celanese Acetate LCC, 2001.
"Yarn" Complete Textile Glossary, Celanese Acetate LCC, 2001.

* cited by examiner

*Primary Examiner*—Jenna Davis
(74) *Attorney, Agent, or Firm*—Harness, Dickey & Pierce, P.L.C.

(57) ABSTRACT

The present invention relates generally to composite materials and to methods of manufacturing the composite materials. In particular, the composite material of the present invention utilizes combinations of continuous fibers in the form of loops, chopped fibers, woven fibers and foams.

9 Claims, 8 Drawing Sheets

STRUCTURAL COMPOSITE

CROSS-REFERENCE TO RELATED APPLICATIONS

This application is a continuation in part of U.S. patent application Ser. No. 10/079,840 filed on Feb. 19, 2002 now abandoned. This application claims the benefit of U.S. Provisional Application No. 60/269,277, filed on Feb. 16, 2001. The disclosures of the above applications are incorporated herein by reference.

FIELD OF THE INVENTION

The present invention relates generally to composite materials and to methods of manufacturing the composite materials. In particular, the composite material of the present invention utilizes combinations of continuous fibers in the form of loops, chopped fibers, woven fibers and foams.

BACKGROUND OF THE INVENTION

While not in any way limited to automotive components, the present invention was conceived in part to meet the need in the automotive industry. Heretofore, automotive suspension components have largely been manufactured from steel due to its known strength and relative durability. These steel automotive components however, suffer from several known disadvantages such as weight and lack of corrosion resistance.

In contrast, the composite material of the present invention is resistant to corrosion and tends to be lightweight (generally at least 50%) lighter than steel components. Further perceived advantages include better damping characteristics, reduction in part counts, and speedy assembly times, among a host of other advantages.

SUMMARY OF THE INVENTION

The present invention relates to composite materials having at least one large loop of continuous fiber reinforcement within a vinyl ester resin. Further, the composite has either chopped or mat fibers which span areas not incorporating the loops of large continuous fiber reinforcement.

The present invention also relates to composite materials having a:
a material matrix, comprising:
  at least one layer of chopped fiber having a first edge and a second edge;
  at least one layer of unidirectional fiber having a first edge and a second edge, wherein the layer of unidirectional fiber is longer than the layer of chopped fiber; and
  at least one layer of a woven roving having a first edge and a second edge, wherein the layer of woven roving is longer than the layer of unidirectional fiber; and
  a foam core,
  wherein each layer is secured around the foam core such that the first edge and the second edge of the layer are staggered respective to the first and second edge of any other layer such that the edges do not produce a single seam over the length of the seam.

The present invention also relates to structures, comprising at least two composites, comprising:
a main body comprising a first loop and a second loop, wherein each loop further comprises a loop of a unidirectional fiber; and
at least three eyelets within the main body, each eyelet comprising at least one loop of a unidirectional fiber, wherein at least one eyelet of each composite is disposed over at least one eyelet of another composite to create a plurality of layers.

The present invention also relates to methods of manufacturing a composite material, comprising:
constructing at least one eyelet;
providing at least one foam core;
guiding a unidirectional fiber around the eyelet and the foam core to form a main body; and
compressing the main body.

Further details and advantages of the composite according to the invention, of the method and of the device, are described with reference to the embodiment illustrated in the drawings.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments are merely exemplary in nature and is in no way intended to limit the invention, its application, or uses.

Figure 1A:
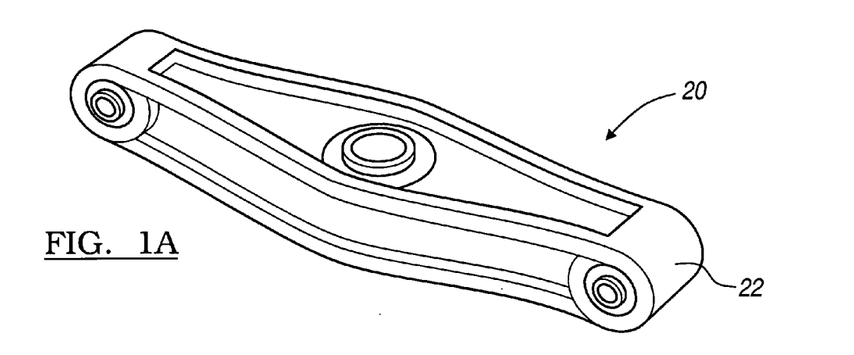
FIGS. 1a–c represent views of composite structures manufactured according to the teachings of the present invention.
Figure 1B:
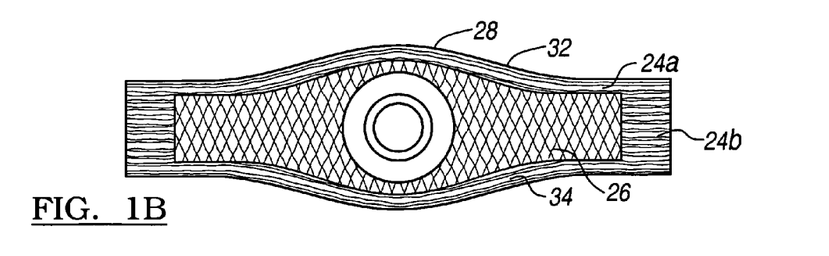
Figure 1C:
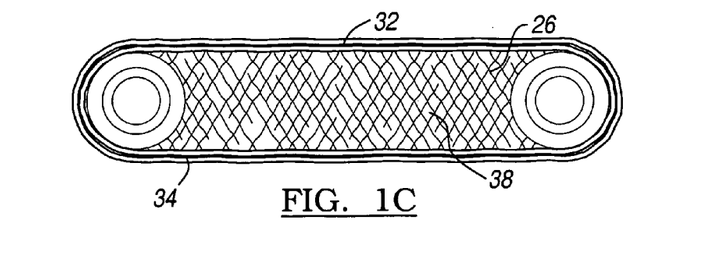

FIGS. 1a–c depict the components of a composite 20 in accordance with the teachings of the present invention. Shown is a component 22 formed from a reinforced vinyl ester resin. By reinforced it is meant that the vinyl ester resin includes fibers such as glass, synthetic fibers such as Kevlar®, carbon fibers, metallic fibers or particulate by way of non limiting example. Each component contains at least one complete and preferably several very large loops of continuous fibers which are incorporated into the primary load bearing portions of the structure. By primary load-bearing portion it is meant that the segment is designed to withstand the majority of tensile, compressive, shear and other static or dynamic loading conditions placed on the composite. Additionally, fibers in the form of a woven mat, individual fibers in chopped or unchopped form or combinations thereof can be used in generally non-load bearing areas to assist in holding the structure together. Particularly useful as a continuous fibers are e-glass yarns, available from Owens Corning. A commercially available vinyl ester resin, which is useful in accordance with the teaching of the present invention is made by Dow Chemical, with the e-glass yarn. Under a highly preferred embodiment, the main component 22 will be formed of a multi-layer construction designated by references numerals 24a and b.

The base materials include, continuous and chopped glass fibers, vinyl ester resin, and a small percentage of inhibitors and curatives. Magnesium dioxide is added to maturate the material. Zinc striate is used as a mold release. Alternative resin systems include polyesters and epoxies. A typical batch of resin would consist of; about 15 kg of vinyl ester resin, from 200–1200 grams and preferably 600 grams of magnesium dioxide, and 100–700 grams and preferably 400 grams of zinc striate, 200 grams of epoxy coloring, and from 10 to 14 grams and preferably 12 grams of inhibitor and about 100 to 150 grams and preferably 125 grams of catalyst. A mixer is used to combine the resin and magnesium dioxide. The zinc stearate is added slowly until all incorporated. The inhibitor and catalyst are added to the mixture separately and mixed for about 15 minutes using a twin sheer blade mixer.

Once produced, the vinyl ester mixture is combined with the continuous fibers to form a pre-preg layer 24a. Initially, doctor boxes are used to distribute chopped glass randomly over the continuous fiber pre-preg layer 24a. The pre-preg layer 24a is wrapped in plastic and compacted and rolled to an appropriate thickness and density. The material is then allowed to maturate for about 48 hours at 68° F. At this point, it can be rolled off, measured, and cut into desired lengths for molding. It is additionally possible to produce the composite by simply taking the coated fiber directly to the mold. For low volume parts, a low temperature long cure cycle process can be used.

After maturation, the pre-preg 24a is cut into predetermined widths with a slitter. The plastic covering is removed from the pre-preg 24 and the pre-preg 24 is wrapped into large loops on a winding machine to fit into the mold. The size of these loops are very important and must correspond to the overall geometry of the load bearing portions. For example, a truck suspension component has two pieces of material cut 4.5 meters long, which are wrapped into two large loops. A single webbing piece of pre-preg being 2.5 meters long is cut for the web section. The original wrapped material is wrapped on a fixture and loaded into the mold. The webbing or spanner piece 26 is inserted into the center of the mold generally perpendicular to the large loops. The material is placed into the mold and the material is cured under pressure and temperatures for a predetermined amount of time. After curing, the part is removed from the mold and de-flashed if required. The part may continue to secondary assembly or shipping directly out of the mold.

Figure 2:
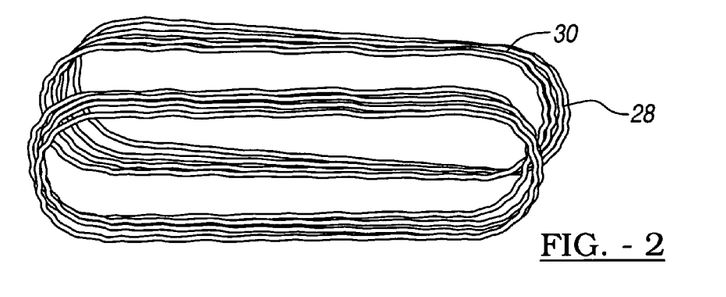
FIG. 2 represents the use of the laminate loops according to first embodiment of the present invention.

As previously mentioned, prior to curing, the continuous fibers 28 are incorporated into the resin bed to form a pre-preg laminate 24. The specific fibers and volume fractions of fibers within the uncured epoxy are dependent upon the engineering specification of the component being produced. Generally, however, the thickness of the component will be modified by using multiple layers of the uncured resin materials. With reference generally to FIG. 2, the layers of the materials are formed into large loops 30 which are incorporated in their uncured state into the mold. After being cured and shaped by the mold, these large loops will become the load bearing portions of the assembly 20. For example, the vehicle suspension component depicted in FIGS. 1a–b is designed to accept tensile and compressive loading. Most of the stresses are borne by the primary load-bearing portions or top and bottom 32 and 34 of the generally I-beam construction. The spanner 26 between the top and bottom portion 32 and 34 is formed using either a resin chopped fiber mix or a resin woven glass construction. While this construction is capable of taking some load, it is envisioned that a majority of the load will be taken by the top and bottom portions of the I-beam construction. The continuous fibers 28 increase both the strength and consistency of production parts. Short fiber reinforced parts can have knit lines where the fibers/resin do not fully form one part. The continuous fibers 28 allow the part to be made without these knit lines, thus reducing the number of failure locations sites.

Figure 3:
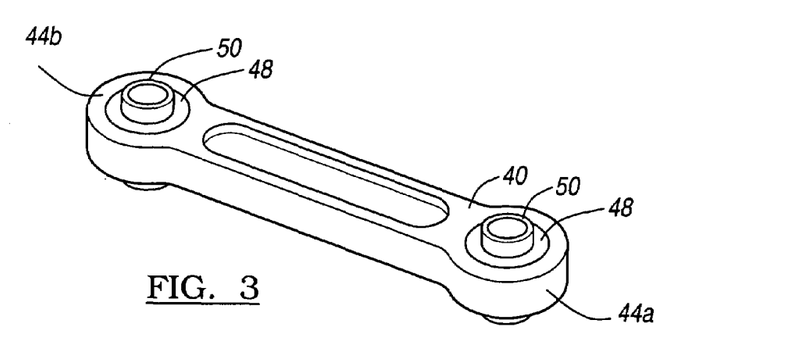
FIGS. 3a–c represent a second composite structure formed according to the teaching of the present invention.
Figure 3A:
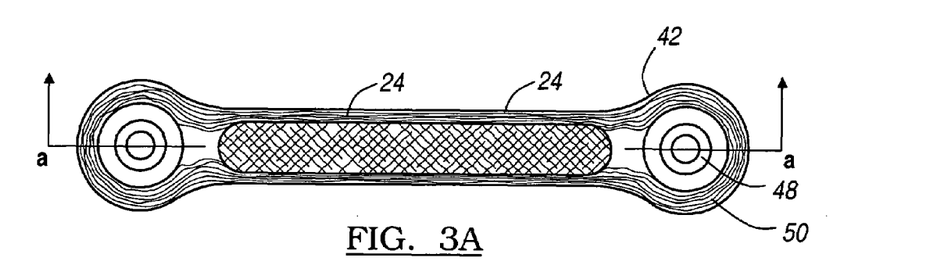
Figure 3C:
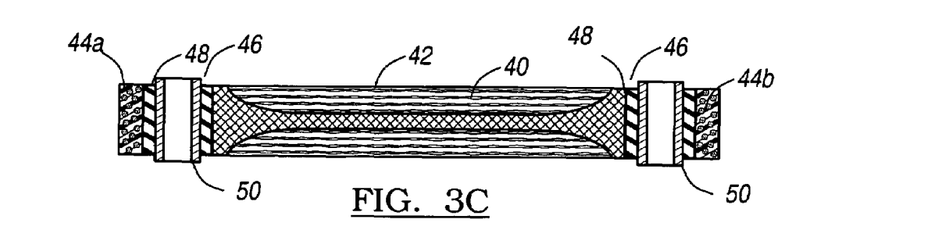
Figure 4:
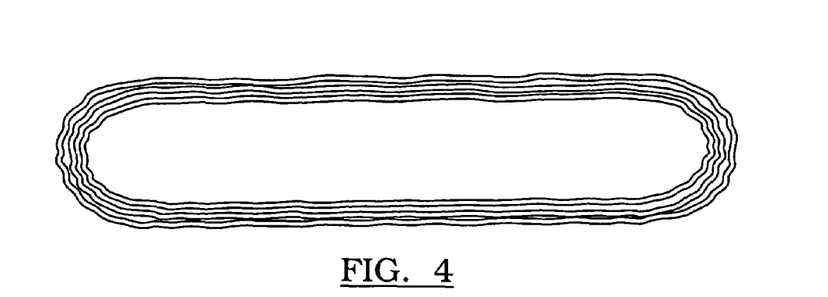
FIG. 4 represents the continuous fiber lay up of the component taught in FIGS. 3a through 3c.

FIGS. 3a–3c represent and alternate composite according to the teachings of the present invention. Shown is a spanner bar 40, which is designed to take a compressive as well as tensile loads. The spanner bar 40 has a plurality of continuous fiber laminate layers 24 forming at least one complete fiber loop circumscribing the periphery 42 of the structure.

FIG. 3c depicts a cross-sectional view of the spanner bar 40. Shown are the laminate layers 24 as well as the chopped fiber reinforced central portion 42. As can be seen, each end 44a and 44b define a through bore 46. Disposed within the through bore 46 is a rubber grommet 48 and steel bushing 50. The through bore 46 can be formed to accept and hold the rubber grommet 48.

Figure 5A:
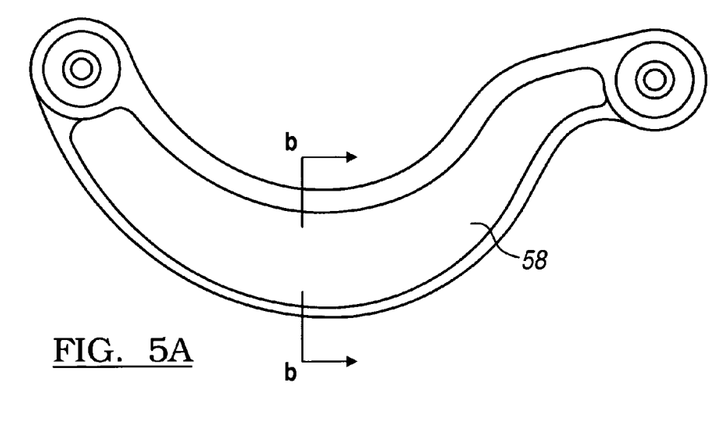
FIGS. 5a–c represent views of a third composite structure according to the teachings of the present invention.
Figure 5B:
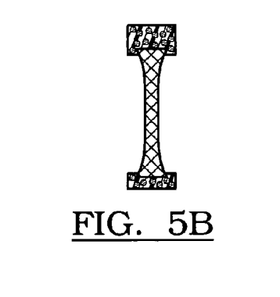
Figure 5C:
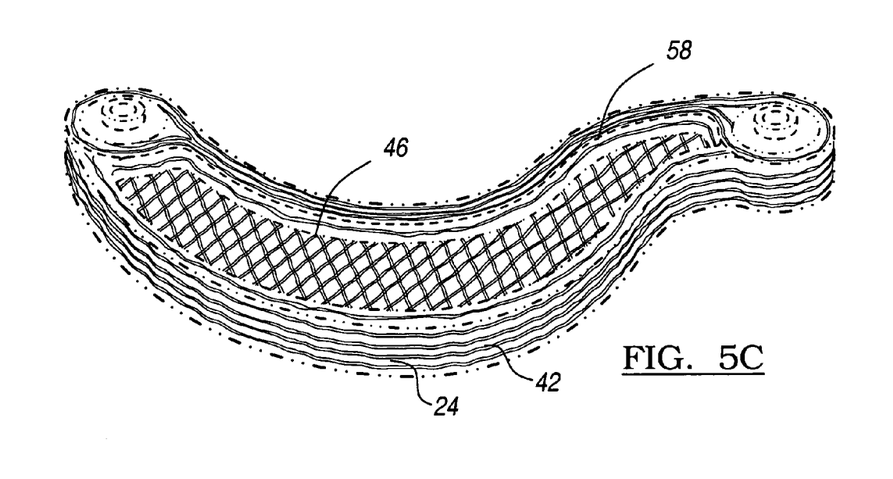

FIGS. 5a–5c represent views of a third embodiment of the present invention. Showed is another suspension component 56 having a general U-shape. As can best be seen in FIG. 5b, the component generally has an I-beam cross section. As with each of the examples previously described, the structure has a plurality of laminate layers 24 disposed about the periphery of the structure. The spanner region 58 utilizes a woven mat 46 as a reinforcement. Additionally, a continuous fiber wrap can be used to surround loading points, such as grommets. The structure periphery is then surrounded by continuous fiber laminate layer 24.

Components made pursuant the present invention can have design failure modes incorporated therein. For example, a rear suspension trailing link, in a crash situation can be designed to split down the middle allowing the axle to move forward, yet maintaining its structural strength intention. This will prevent the axle from moving rearward into the fuel tank. Furthermore, the material according to the present invention is recyclable for use in low stress parts. For example, the recycled material can be used in rear doors for trucks or truck van trailers. The rear doors have two functions, first, to cover the back of the trailer and second, to hold the back of the trailer in the square which requires diagonal strength.

Molds for use with the material according to the present invention are designed with integral knot out (KO) system, which is actuated by the press. The resin is forced out of the material at high pressure and tends to "glue" the KO pins in place. The mold system that uses great force to reject the part and cleans the KO pins on each cycle. Molds and critical aspects of the part are designed with 0 degree draft angles. For example, the bushing eye of a link has no draft angle; this makes the bushing design simpler and more durable. With this regard, bushings can be incorporated directly into the structure without bushing housings, thus reducing weight and costs.

Further, the material according to the present invention has a 5× higher damping ratio as compared to steel (depending upon the design). This increase in dampening reduces the high frequency resonance associated with certain steel and aluminum parts. This resonance is a contributor to poor noise properties in the vehicle. Further, as vibration dampers are used to dampen known vibrations, conventional dampers use rubber as a flexible element. The rubber deflection needs to be limited due to durability concerns. As opposed to the use of conventional dampers, the material according to the present invention can be modified to increase specific masses along nodal points 38 of known resonant frequencies for the component. This increases the overall damping of the structure and reduces the necessary material thicknesses for other components within the vehicle. Additionally, it reduces secondary assembly costs as it will reduce the number of mass vibration dampers needed on a vehicle.

By way of non-limiting example, preferred method for producing a composite produce with the invention will now be described with reference to the figures, including FIGS. 2 and 3 in particular. Production of the composite which has the e-glass yarn imbedded in the resin is prepared by the following steps:

Utilizing a sheer blade mixer, first place Durakan 790 from Dow Chemical into a mixing apparatus. Mix slowly for four minutes while adding $MgO_2$, zinc striate from Ferro Corporation, Cleveland, Ohio, and a predetermined epoxy coloring. While mixing, add a 7080 inhibitor in the form of a para-benzoquinone blended in a diallyl phthalate monomer from Plasticcolors, Inc. of Ohio and 320a accelerant for 15 minutes while constantly monitoring the material temperature so that it does not exceed 80 degrees Farenheight. E-glass yarns being made of glass fibers purchased from Owens Corning Fiberglass are provided. Each continuous e-glass yarn should be larger than 15 feet in length and more preferably, larger than 20 feet in length and even more preferably, larger than 25 feet in length. The continuous e-glass yarns are coated with resin to form a pre-preg material.

Next in the process, an e-glass chopped fiber material is provided. The chopped glass material is randomly disposed over the pre-preg. The amount of chopped glass to be disposed should be such that 10 to 30% and preferably 20% of the weight of the glass should be chopped glass and 40 to 70% and preferably 80% of the weight should be linear glass. The resin and glass should be run through a standard rolling machine to adjust the thickness of the material. The total mixture ratio is dependent on the product to be made. For example, for a suspension link, a ratio of 38% resin to 62% e-glass by weight is desirable. After the material has been made, it is necessary for it to maturate for 40 hours at 70° F. before use. The material now has a two week shelf life for manufacturing use.

Figure 6A:
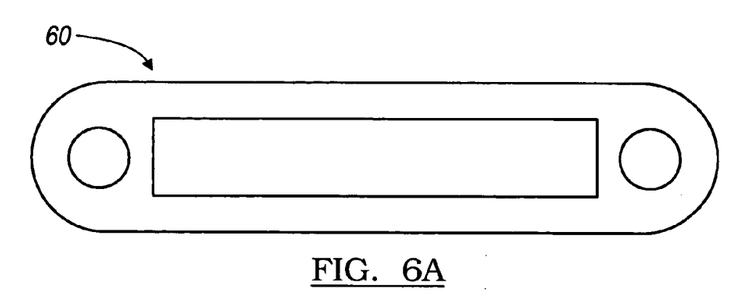
FIGS. 6a–b represents the composite structures manufactured according to the teachings of the present invention.
Figure 6B:
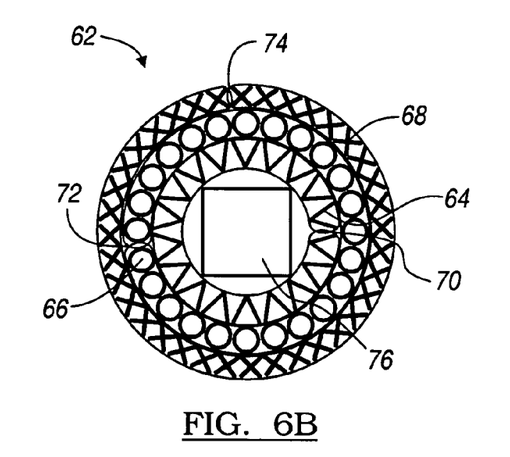

FIGS. 6a–b represent a fourth embodiment of the present invention. FIGS. 6a–b depict the components of a composite 60 in accordance with the teachings of the present invention. Shown is a component 60 formed from a material matrix 62. The material matrix is formed from layers chopped fiber 64, unidirectional fiber 66 and woven roving 68. A single layer of each component or a plurality of layers in combination may form the material matrix 62. The chopped fiber 64, unidirectional or continuous fiber 66 and woven roving 68 are pre-cut such that each layer is of the same width but has a different length. The chopped fiber 64 layer has the shortest length, the unidirectional fiber 66 layer is longer than the chopped fiber 64 layer and the woven roving 68 is the longest layer. The layers of fibers are of sufficient length to wrap around a foam core 76. Lengthwise, each fiber layer terminates in a first edge and a second edge that meet after wrapping the layer around the foam 66 to form seams 70, 72 and 74, respectively. As depicted in FIG. 6b, the seams 70, 72 and 74, generally do not overlap and are staggered respective to each other whereby the edges do not produce a single seam line over the length of the composite.

The chopped fiber 64, the unidirectional fiber 66 and the woven roving 68 may include fibers such as glass, synthetic fibers, such as Kevlar®, carbon fibers, metallic fibers or particulate by way of non limiting examples. The chopped fiber 64 serve as a binding material between the foam core 76 and the material matrix 62. In various embodiments, the chopped fibers may be placed between the unidirectional fiber 66 layer and the woven roving layer 68 to provide adequate binding. The chopped fiber 64 also provides compressive strength to the material matrix 62. The appropriate amount of chopped fiber 64 used is determined by the number of layers of material, cross section of the foam core 76, the total diameter of the finished composite and the desired structural properties.

Unidirectional fibers 66 are present within the composite material and around the circumference of the outer perimeter of the component geometry. Unidirectional fibers 66 are also used to form components of the composite such as the eyelets 80, as described later herein. The unidirectional fiber 66 provides a support base for the chopped fiber 64 and may be interlocked with the woven roving 68 and the fabric matrix and provide enhanced load bearing properties. The unidirectional fiber 66 provides supplemental stiffness and tensile strength to the material matrix 62. The amount of unidirectional fiber 66 incorporated into the composite is determined by the amount of tensile loading the specific component requires.

The woven roving 68 is the component which wraps around or encloses all other material matrix 62 components. In an exemplary embodiment containing more than one layer of a material matrix 62 element, the woven roving 68 is a layering of +/−45 woven roving and 0/90 woven roving. Multiple layers of the +/−45 woven roving 68 may be placed in between two or more layers of 0/90 woven roving 68. Alternatively, layers of the 0/90 woven roving 68 may be placed between two or more layers of the +/−45 woven roving 68. it is understood that the woven roving 68 fibers may incorporate different angles than those listed herein. This combination of woven roving 68 materials improves the strength of the material matrix 62 by removing stress on the system.

The foam core 76 preferably is a high-density foam and the specific type of foam is selected based on the desired end properties. It may be desirable to have a closed cell structure foam or a foam which is compatible with other materials such as polyester, vinyl ester, epoxy and pre-peg systems. The stiffness, impact strength and fatigue strength of the foam core 76 provide structural, dimensional and thermal stability to the composite 50. Furthermore, the foam core provides enhanced torsional and compressive load bearing properties. Commercially available foams, which are useful according to the teachings of the present invention are manufactured by ATC Chemicals, Inc. under the name the Core-Cell® Foams broadly categorized as A Foams, P Foams, S Foams and T Foams. Specific subtypes of these foams may be selected based on particular attributes, such as density, chemical compatibility, compression strength and modulus, shear strength and elongation, thermal conductivity, insulation properties, etc. In embodiments of the present invention, Core-Cell® A600 foam and Core-Cell® T 600 foam are preferred.

In a fifth embodiment, the composite is in the form of a control rod having at least one eyelet 80. The control rod may vary in length and diameter at its cross section. As depicted, the control rod 50 has two eyelets, but in various embodiments, the control rod may have a plurality of eyelets 80. The eyelets are formed from loops of unidirectional fiber 66. The foam core 76 runs the length of the control rod in between the eyelets 80. The foam core 76 is preferably placed in the center of the part to provide even loading conditions and balance equal shares of the load bearing aspects to the surrounding fibers over its cross section. Preferably, the foam core 76 has an initial cross section of approximately 75% of the total diameter of the control rod. After the foam core 76 cross section is compressed, the foam is about 40% of its original dimension.

To construct the control rod, a pre-form is fabricated using a mold. Woven roving 68 is the outermost surface layer of the composite and is therefore the first layer placed into the cavity of the control rod 68 main body mold. Alternate layers of +/−45, 0/90 woven roving 68 may then placed into the cavity. The unidirectional fiber 66 is then placed into the pre-form on top of the woven roving 68. The unidirectional fiber 66 may also run along the inner perimeter of the pre-form. Next, a layer of chopped fiber 64 is placed on the innermost layer of the fabric lay-up. The foam core 76 is placed on the chopped fiber 64 and an additional layer of chopped fiber 64 is placed on top of the foam 66. As stated above, the chopped fiber 64 serves as a binder in the material matrix 62 and may be dispersed between each layer or selected layers.

After the desired layering of materials is placed into the pre-form, the layers are then folded or rolled over onto themselves. Generally, the layers are folded over, one layer at a time beginning with the innermost layer of chopped fiber 64, followed by folding of the unidirectional fiber 66 layer and the woven roving 68 layer. It is understood that any selected group of or all of the layers may be folded over simultaneously. The folding and/or subsequent arranging of the layers is performed to ensure that seams 70, 72 and 74 of the material matrix 62 are staggered to prevent forming a single seam across the length of the control rod. The pre-form is then loaded into the mold and the mold is closed and placed inside of a press for a predetermined period of time and temperature for final curing.

The compression and curing provides a composite with enhanced strength. By compressing the foam core 76 to approximately 40% of its original dimension, the foam core 76 has increased density over its length and provides greater stiffness of the cross section. The cross section stiffness provides improved durability characteristics in the control rod for torsional and compressive load bearing. The combination of chopped fiber 64, unidirectional fiber 66 and the foam core 76 wrapped inside of multiple layers of material providing an interlocked material matrix 62 and supplements the strength derived from compression of the foam core 76. The changing of the material matrix 62 direction, the intertwined layers within the internal structure the composite and the staggered seams provide enhanced load resistance and strength and also allows for the final product to be designed to a specific set of given engineering load conditions.

In various embodiments, additional chopped fiber 64 may be added around the eyelet 80 and the outermost ends of the foam 76 which are in contact with the eyelet 80. The addition of chopped fiber 64 in these areas improves the components overall compressive stiffness and works in conjunction with the foam core 76.

Figure 7A:
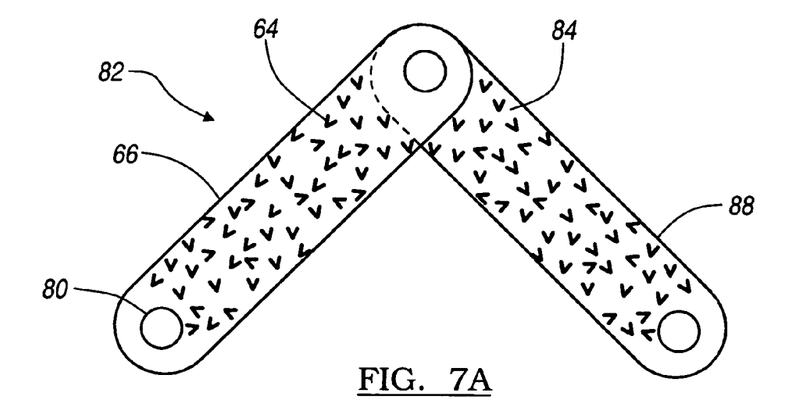
FIGS. 7a–b represent the main body of a composite structure according to teachings of the present invention.
Figure 7B:
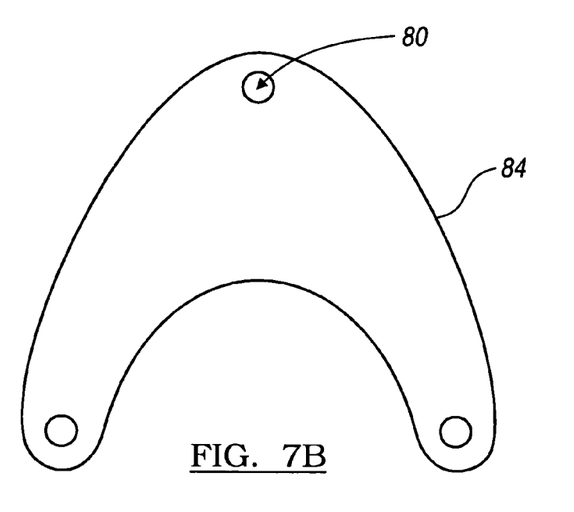

The sixth embodiment of the present invention provides a structure 82, comprising a main body 84 having a first loop 86 and a second loop 88. Each loop 86 and 88 is comprised of a unidirectional fiber 66. Within the main body 84, there are at least three eyelets 80 and each eyelet 80 comprises at least one loop of unidirectional fiber 66. At least one eyelet 80 of either the first loop 86 or the second loop 88 is disposed over at least one eyelet of another main body 84 to create a plurality of layers of main bodies 84. As shown in FIG. 7a, the main body 84 may have a highly recessed region between the first loop 86 and the second loop 88 and the recessed region is in close proximity with one eyelet 80. This main body 84 is produced by tightly winding the unidirectional fiber 66 around each of the eyelets in the loops. As shown in FIG. 7b, the unidirectional fiber 66 may widely wind around the eyelets 80 thus producing a less pronounced division between the first loop 86 and the second loop 88 due to the unidirectional fiber 66 being at a further distance from one eyelet 80. The perimeter of the structure may be covered with a woven roving 68 or the main body 84 may incorporate chopped fiber 64.

Figure 8A:
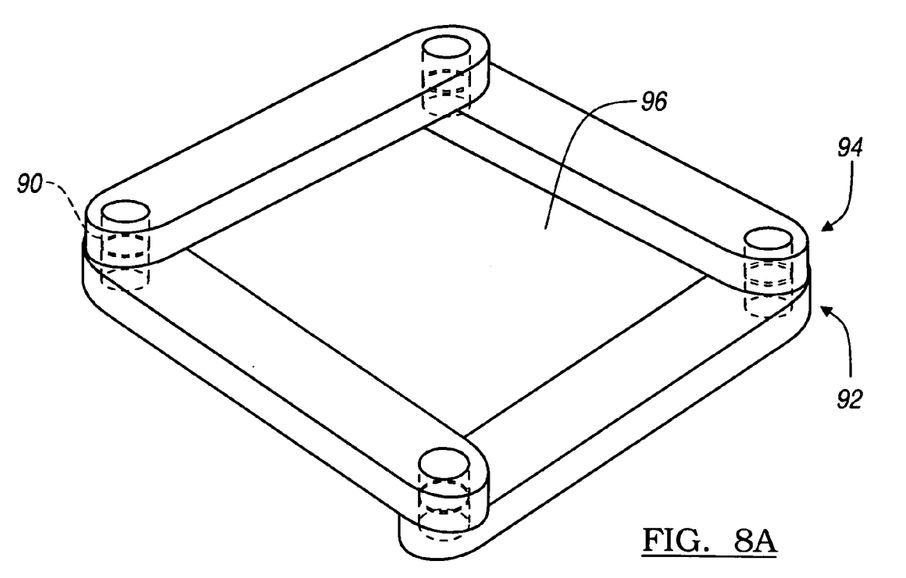
FIG. 8a–d represent the composite structure according to the present invention.
Figure 8B:
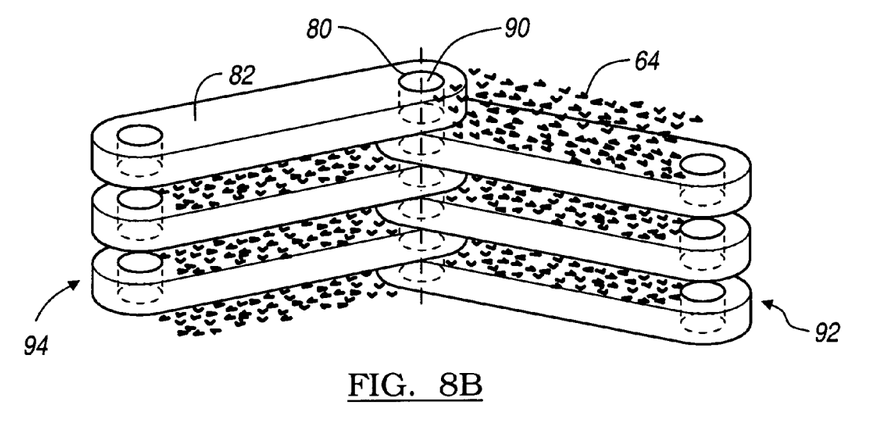

As depicted in FIG. 8a, two main bodies 84 are stacked to form the structure 82 and a tunnel 90 is created between the eyelets 80 of each main body 84. The stack provides a series of layers where a first layer 92 has a first thickness and a second layer 94 has a second thickness. FIG. 8b is a side view of a plurality of main body 84 components forming the structure 82. Spaces or voids may be created by the relative orientation and stacking of layers and the layer build up contributes to the total thickness of the structure 82. These spaces may be filled with chopped fibers 64.

The structure 82 may also incorporate an aperture 96 between the joined main bodies 84. The aperture 96 may incorporate chopped fibers 64 or a foam core 76, according to the teachings herein. The foam core 76 may be shaped to the size of the aperture 96 such that pre-compression cross section of the foam core 76 changes as the cross section of the aperture 96 changes.

Figure 8C:
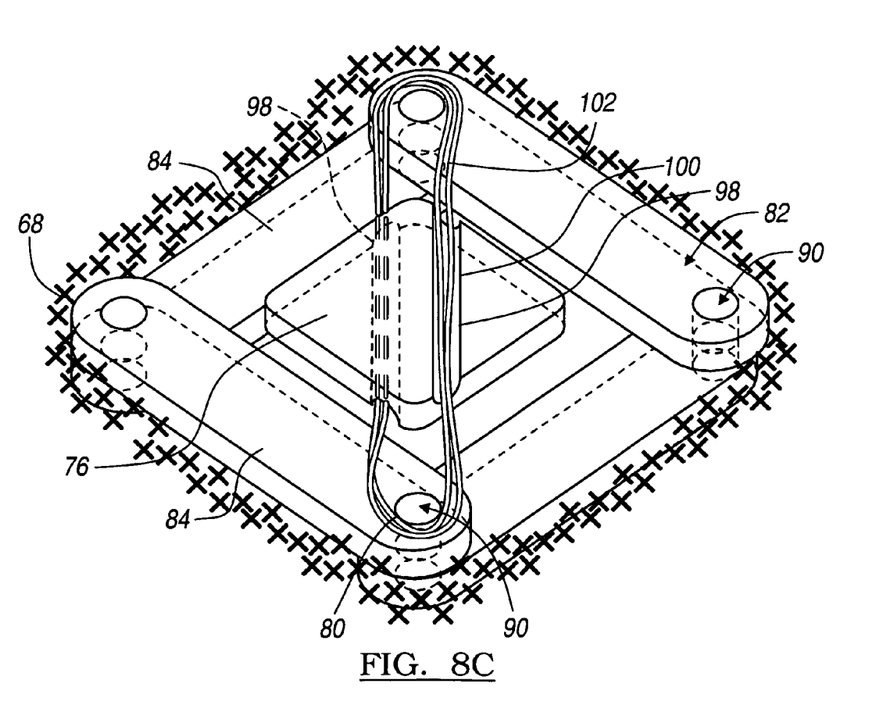
Figure 8D:
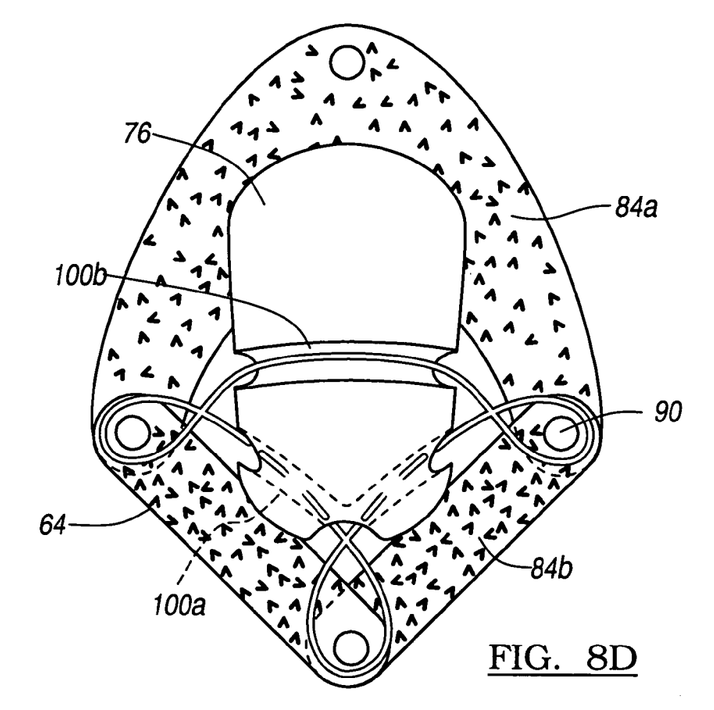

In various embodiments, it may be useful to have the foam core 76 of a different shape or larger than the aperture 96. Examples of such embodiments include where the foam core 76 is larger than the aperture or where the main body 84 components provide a complex web such that only a minimal aperture 96 is created. The foam core 76 may incorporate a guide notch 98 and/or a guide passage 100 to allow the passage of a traveling fiber 102 through the foam and across the structure 82 (FIG. 3c). As depicted, the traveling fiber 102 is a single loop, but it is understood that the depiction is merely for exemplary purposes and the traveling fiber 102 may represent a segment of a main body 84 such as a first loop 86. Depending on the relative dimensions of the structure 82 and the number and types of main bodies 84 employed in the system, the guide notch 88 and guide passage 100 may be located at any discrete region on the foam or may travel the dimensions of the foam core 76 along a set pattern (i.e.: top, sides, bottom or combinations thereof). The guide notches 98 and guide passages 100 are particularly useful in embodiments having similarities to the structure of FIG. 8d which combines the dissimilar main body 84a of FIG. 7b and the main body 84b of FIG. 7c. Returning to FIG. 8c, the spaces within the foam core 76 resultant from the guide notch 98 and the guide passage 100 may also include chopped fiber 64.

Figure 9A:
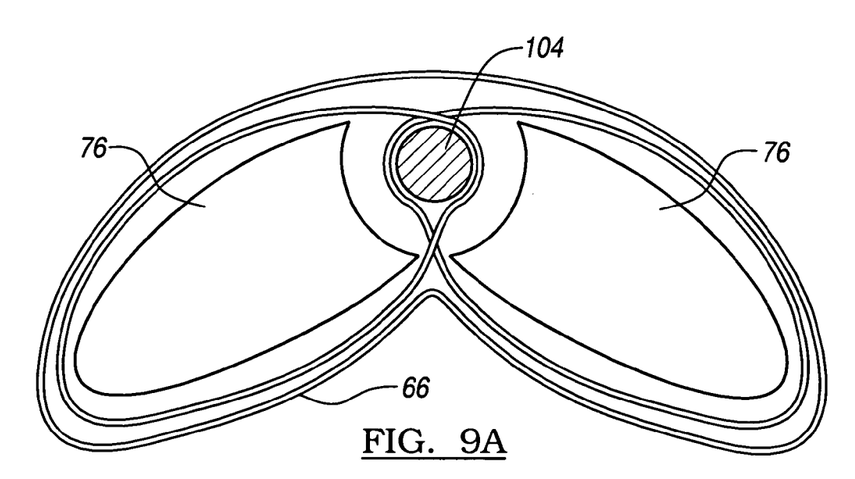
FIGS. 9a–b represent methods and composites formed according to teachings of the present invention.
Figure 9B:
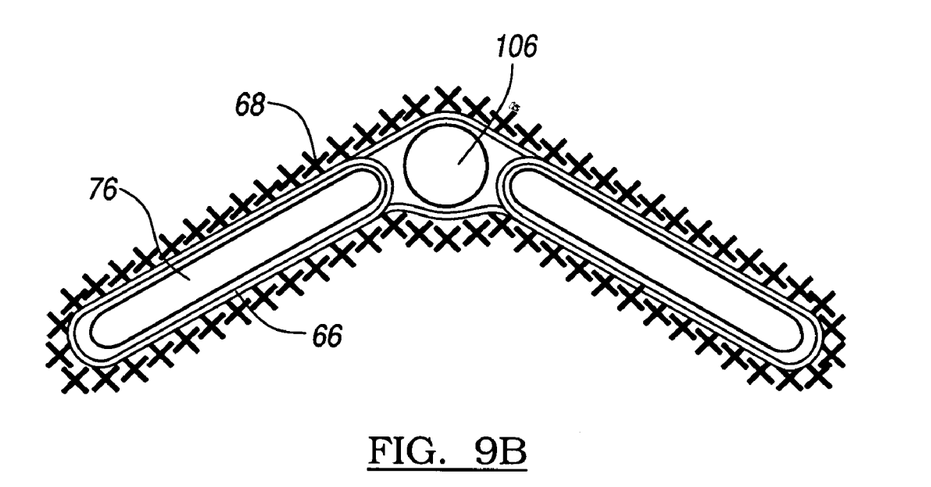

Referring to FIGS. 9a and 9b, embodiments of the present invention also provide methods of manufacturing a composite material. The method includes constructing at least one eyelet, providing at least one foam core 76, guiding a unidirectional fiber 66 around the eyelet and the foam core 76 to form a system and compressing the system.

The eyelet may be a bushing eyelet 106 the construction of which may be performed without the use of a traditional bushing outer metal. To form the eyelet, the unidirectional fiber 66 is guided around a mandrel 104. The mandrel 104 is of a predetermined diameter relative to the amount of rate characteristics desired in the bushing. In a preferred embodiment, the unidirectional fiber 66 is radially wrapped around the mandrel 104. An exemplary guiding method includes the use of a winding machine or any other suitable device. The methods of the present invention eliminate the need for the bushing outer metal, allow a similar material press fit into a final assembly and provide pre-compression of the rubber cross section in such a manner as to provide a change in the dynamic characteristics of the bushing and improve durability. Instead of relying on the bushing outer metal to provide the pre-compression aspect, the composite provides the pre-compression aspect. This reduces the weight and the cost associated with traditional bushing eyelets.

As depicted in FIG. 9a, combinations of unidirectional fiber 66 guidance directions may include around the mandrel 104 and subsequently around the foam core 76. For example, the unidirectional fiber 66 may be partially or completely looped around the mandrel 104 and the foam core 76, around the mandrel 104 and a selected foam core 76 or in one complete loop encompassing all foam cores 76 and the mandrel 104. In addition to the unidirectional fiber 66, woven roving or +/−45 fibers may be looped around the system, the mandrel 104, the foam core 76, and combinations thereof in a similar fashion. The system may also incorporate chopped fibers throughout, according to the teachings herein.

The composite formed according to these various methods is cured under pressure and temperatures for a predetermined amount of time. The compression reduces the foam core 76 to about less than 40% of its original size. After curing, the part is removed from the mold and de-flashed if required. The part may continue to secondary assembly or shipping directly out of the mold. Prior to or during compression, additional steps may be employed to maintain the diameter of the mandrel 104 as the diameter of the resultant bushing eyelet 106 or the bushing eyelet 96 may be compressed similar to the foam core 76. The methods may be used to form control rods or other composites.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A composite, comprising:
a material matrix, comprising:
at least one layer of chopped fiber having a first edge and a second edge;
at least one layer of unidirectional fiber having a first edge and a second edge, wherein the layer of unidirectional fiber is longer than the layer of chopped fiber; and
at least one layer of a woven roving having a first edge and a second edge, wherein the layer of woven roving is longer than the layer of unidirectional fiber; and
a foam core,
wherein each layer is secured around the foam core such that the first edge and the second edge of each of the layers are staggered respective to the first and second edge of any other layer such that the edges do not produce a single seam over the length of the composite.

2. The composite according to claim 1, wherein said matrix defines two eyelets, and wherein the foam core spans the length of the composite between the eyelets.

3. A composite, comprising:
a foam core,
at least one layer of chopped fiber having a first edge and a second edge, said layer of chopped fiber being disposed about said foam core;
at least one layer of unidirectional fiber having a first edge and a second edge, said layer of unidirectional fiber being disposed about said foam core; and
at least one layer of a woven roving having a first edge and a second edge, said layer a woven roving being disposed about said foam core; and
wherein each layer is secured around the foam core such that the first edge and the second edge of each layer are staggered respective to the first and second edge of any other layers such that the edges do not produce a single seam over the foam core.

4. A composite according to claim 3, wherein the composite material defines at least one coupling hole adjacent to the foam core.

5. A composite according to claim 3, frirther comprising additional chopped fibers not in the layer of chopped fibers.

6. A composite according to claim 5 wherein the additional chopped fibers are disposed adjacent the foam core.

7. A composite according to claim 6, wherein the foam core defines at least one guide notch.

8. A composite according to claim 7, comprising chopped fibers disposed within the guide notch.

9. A composite according to claim 3, wherein an exterior surface of the composite comprises woven roving.

* * * * *